(12) United States Patent
Knott et al.

(10) Patent No.: US 9,146,173 B2
(45) Date of Patent: Sep. 29, 2015

(54) REUSABLE ENERGY ABSORBING LAB SEAT

(71) Applicants: Michael Knott, Hollywood, MD (US);
Brandon Hall, Hollywood, MD (US);
Zachary Cass, Knoxville, TN (US)

(72) Inventors: Michael Knott, Hollywood, MD (US);
Brandon Hall, Hollywood, MD (US);
Zachary Cass, Knoxville, TN (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 127 days.

(21) Appl. No.: 14/178,556

(22) Filed: Feb. 12, 2014

(65) Prior Publication Data

US 2015/0226635 A1    Aug. 13, 2015

(51) Int. Cl.
*G01M 7/00*    (2006.01)
*G01N 3/00*    (2006.01)
*B60R 21/00*   (2006.01)
*G01M 7/08*    (2006.01)

(52) U.S. Cl.
CPC ...................................... *G01M 7/08* (2013.01)

(58) Field of Classification Search
None
See application file for complete search history.

(56) References Cited

U.S. PATENT DOCUMENTS

| | | | | |
|---|---|---|---|---|
| 5,791,597 A * | 8/1998 | Knoll | | 244/121 |
| 6,189,946 B1 * | 2/2001 | Levin | | 296/68.1 |
| 6,481,777 B2 * | 11/2002 | Mans | | 296/68.1 |
| 8,641,140 B2 * | 2/2014 | Swierczewski | | 297/216.15 |
| 8,882,194 B2 * | 11/2014 | Marini et al. | | 297/216.13 |
| 2004/0183344 A1 * | 9/2004 | Glance et al. | | 297/216.1 |
| 2011/0226037 A1 * | 9/2011 | Rajasingham et al. | | 73/12.01 |
| 2012/0319442 A1 * | 12/2012 | Clement | | 297/216.11 |
| 2013/0328364 A1 * | 12/2013 | Cecinas et al. | | 297/216.1 |
| 2014/0354027 A1 * | 12/2014 | Kolb | | 297/452.1 |

* cited by examiner

*Primary Examiner* — Peter Macchiarolo
*Assistant Examiner* — Jermaine Jenkins
(74) *Attorney, Agent, or Firm* — Mark O. Glut; NAWCAD

(57) ABSTRACT

The reusable energy absorbing lab seat 10 includes a seat bucket for holding an anthropomorphic test device, a seat support structure, an energy absorbing system, a false floor structure, and a fail-safe system. The seat support structure is for securing the seat bucket to a sled that corresponds to a horizontal accelerator. The energy absorbing system is for absorbing energy imposed by the horizontal accelerator on the seat bucket and the anthropomorphic test device. The false floor structure is for simulating a real floor of a vehicle or aircraft. The fail-safe system is for reducing damage to the reusable energy absorbing seat, the anthropomorphic test device, and lab facilities in case the energy absorbing system fails.

7 Claims, 5 Drawing Sheets

REUSABLE ENERGY ABSORBING LAB SEAT

STATEMENT OF GOVERNMENT INTEREST

The invention described herein may be manufactured and used by or for the Government of the United States of America for governmental purposes without payment of any royalties thereon or therefor.

BACKGROUND

Currently when testing personnel mounted equipment a horizontal accelerator is used. A horizontal accelerator may be defined, but without limitation, as an apparatus that can make an object move along a track at various speeds and can be used to create acceleration forces and pulse shapes typically seen in crashes and other types of accelerated environments. Typically during testing a rigid seat is used on the accelerator. Rigid seats are not representative of the type of seats utilized in aircraft or real world vehicles. Crashworthy energy absorbing seats are used in modern military rotorcraft and other vehicles to help protect personnel on the aircraft from the potentially lethal forces experienced during a crash. The crashworthy seating systems that are used in aircraft can cost in excess of $80,000 per seat. Therefore, utilizing these seats to qualify and test personnel mounted equipment tend to be cost prohibitive. Utilizing a rigid seat in testing and/or in laboratory environments results in inaccurate data when testing is conducted in vertically oriented crash tests. As a result, a reusable energy absorbing test seat that accurately simulates crashworthy seats used in aircraft is needed.

SUMMARY

The present invention is directed to a reusable energy absorbing lab seat (REAL seat) that meets the needs enumerated above and below.

The present invention is directed to a reusable energy absorbing lab seat that includes a seat bucket for holding an anthropomorphic test device, a seat support structure for securing the seat bucket to a sled, the sled corresponding to a horizontal accelerator such that energy may be imposed by the horizontal accelerator on the seat bucket and the anthropomorphic test device, an energy absorbing system for absorbing energy imposed by the horizontal accelerator on the seat bucket and the anthropomorphic test device, a false floor structure for simulating a real floor of a vehicle, the false floor structure being able to be adjusted based on the size of the anthropomorphic test device, and a fail-safe system for reducing damage to the reusable energy absorbing seat, the anthropomorphic test device, and lab facilities in case the energy absorbing system fails.

It is a feature of the present invention to provide a reusable energy absorbing lab seat that accurately represents an energy absorbing seat typically used in military aircraft.

It is a feature of the present invention to provide a reusable energy absorbing lab seat that can be utilized on a horizontal accelerator.

It is a feature of the present invention to provide a reusable energy absorbing lab seat that can be used to accommodate the $5^{th}$ percentile female through the $95^{th}$ percentile male anthropomorphic test device.

It is a feature of the present invention to provide a reusable energy absorbing lab seat that can be used to simulate a crash to determine human injuries caused as result of a crash, and to help maximize survivability of person in such a crash.

DRAWINGS

These and other features, aspects and advantages of the present invention will become better understood with reference to the following description and appended claims, and accompanying drawings wherein FIG. 1 is a side view of an embodiment of the reusable energy absorbing lab seat on the horizontal accelerator;

DESCRIPTION

Figure 1:
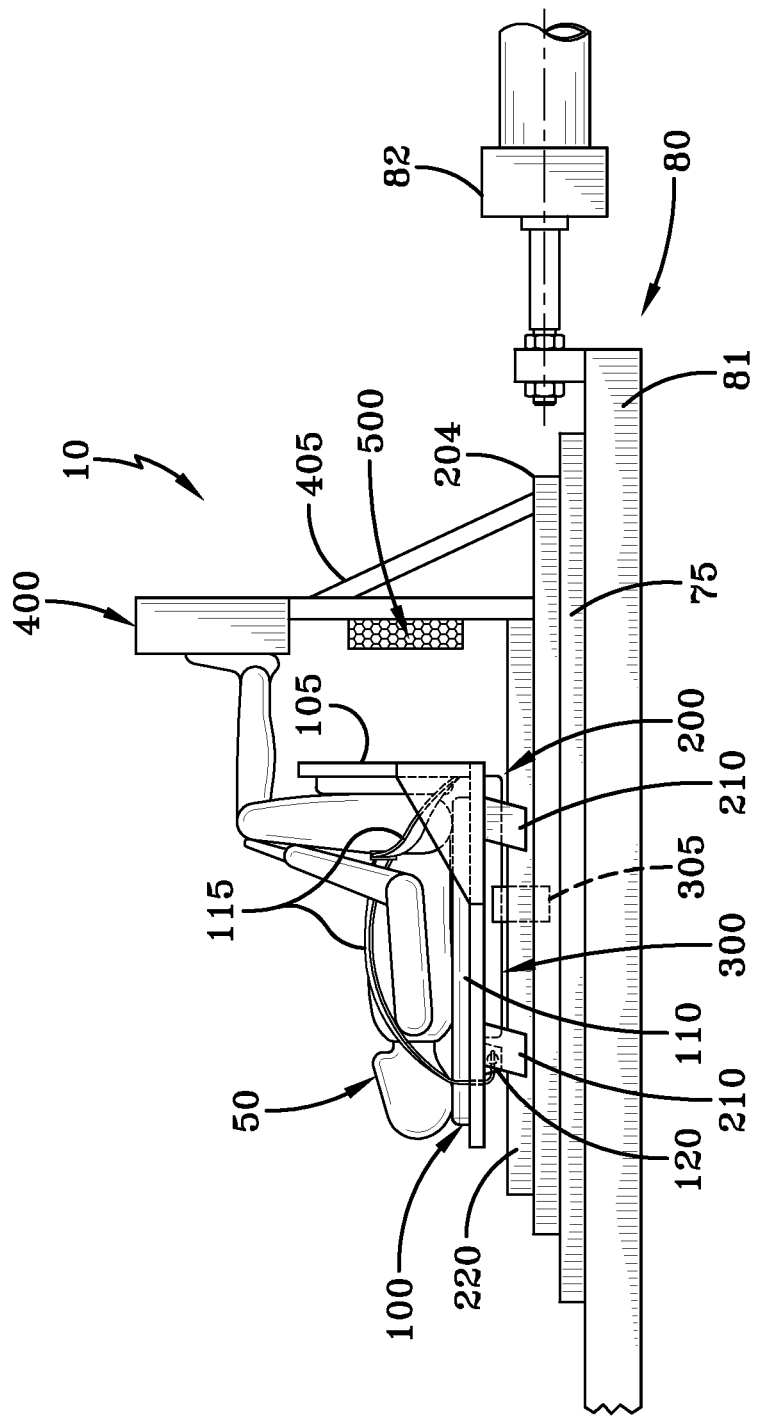

The preferred embodiments of the present invention are illustrated by way of example below and in FIGS. 1-7. As shown in FIG. 1, the reusable energy absorbing lab seat 10 includes a seat bucket 100, a seat support structure 200, an energy absorbing system 300, a false floor structure 400, and a fail-safe system 500. The seat bucket 100 is for holding an anthropomorphic test device 50. An anthropomorphic test device 50 may be defined as, but without limitation, a crash test dummy or any type of test device that is representative of the human body. The seat support structure 200 is for securing the seat bucket 100 to a sled 75. The sled 75 corresponds to a horizontal accelerator 80 such that energy may be imposed by the horizontal accelerator 80 on the seat bucket 100 and the anthropomorphic test device 50. The energy absorbing system 300 is for absorbing energy imposed by the horizontal accelerator 80 on the seat bucket 100 and the anthropomorphic test device 50. The false floor structure 400 is for simulating a real floor of a vehicle or aircraft. The false floor structure 400 is able to be adjusted based on the size of the anthropomorphic test device 50. The fail-safe system 500 is for reducing damage to the reusable energy absorbing seat 10, the anthropomorphic test device 50, and lab facilities in case the energy absorbing system 300 fails.

In the description of the present invention, the invention will be discussed in a military aircraft environment; however, this invention can be utilized for any type of application that requires use of a reusable energy absorbing lab seat 10.

Figure 2:
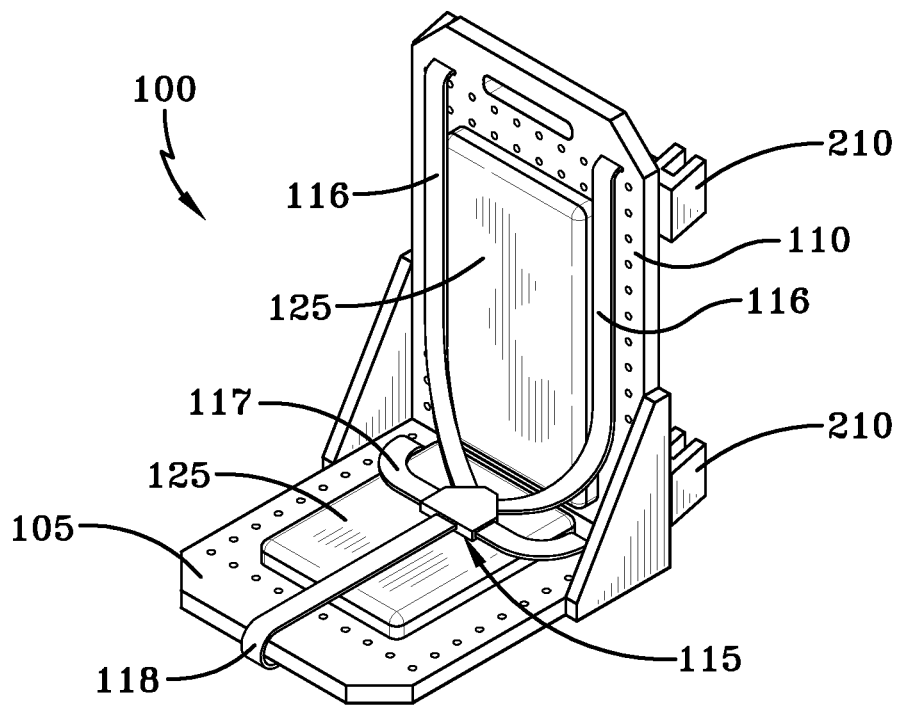
FIG. 2 is a perspective view of the seat bucket.
Figure 3:
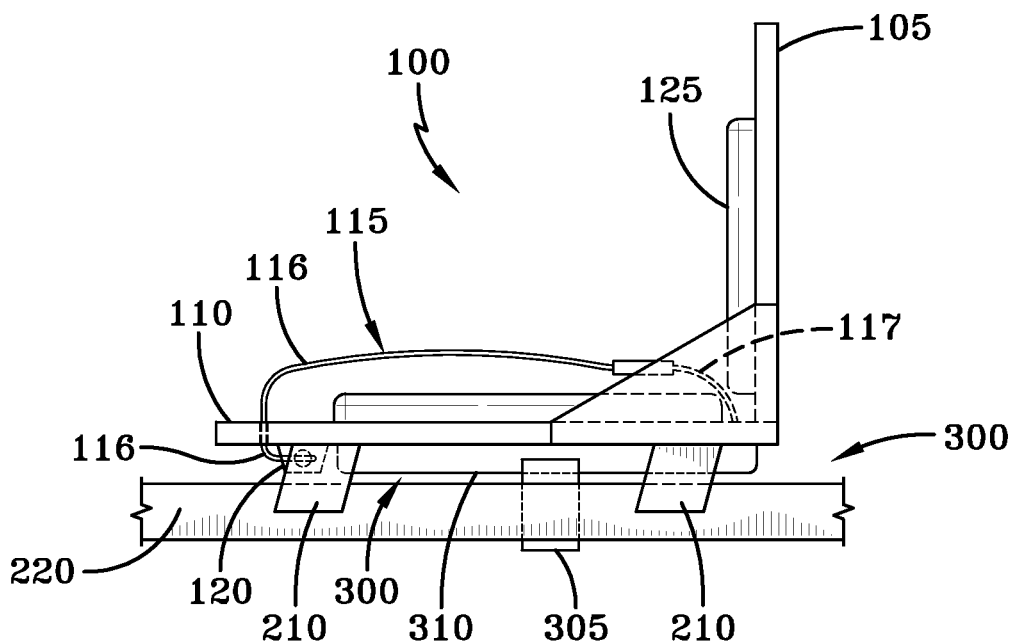
FIG. 3 is a side view of the seat bucket.
Figure 6:
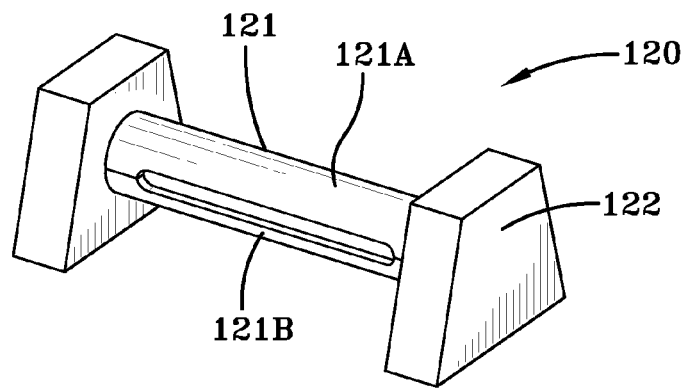
FIG. 6 is a perspective view of an embodiment of the mock inertia reel.
Figure 7:
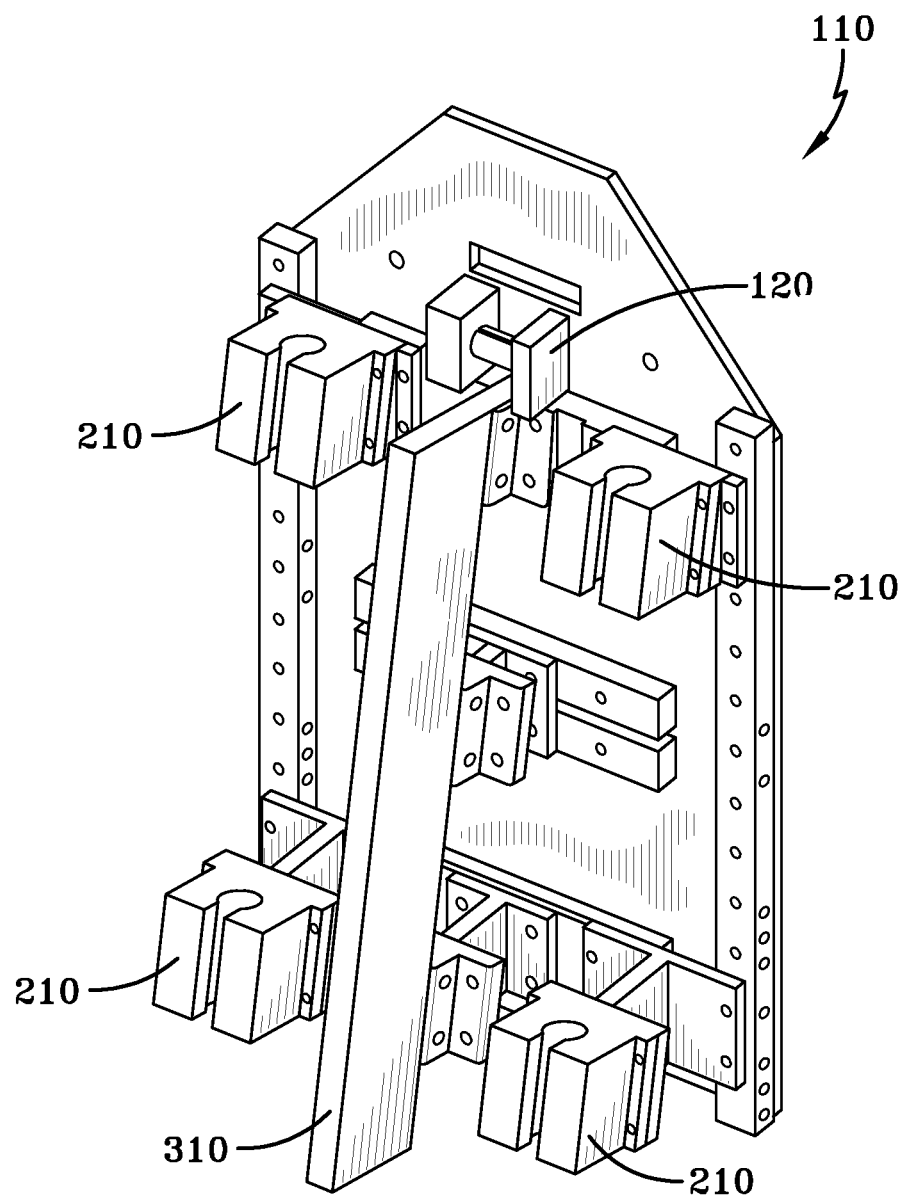
FIG. 7 is a perspective view of the back of the seat bucket.

As shown in FIGS. 1, 2, and 3, the seat bucket 100 includes a seat pan 105, a seat back 110, a restraint system 115, a mock inertia reel 120, and seat cushions 125. The seat pan 105 and seat back 110 are positioned at an appropriate angle to simulate a seat utilized in an aircraft or vehicle. As shown in FIGS. 2 and 3, the seat pan 105 and the seat back 110 have corresponding seat cushions 125. The restraint system 115 may include over the shoulder restraints 116, a lap strap 117, and a crotch strap 118. As shown in FIGS. 1, 3, and 7, the mock inertia reel 120 is placed on the back of the seat back 110 and is used to simulate the use of an actual inertia reel found on crashworthy seating systems. Inertia reels are typically used on crashworthy seating systems to allow users to adjust their body positions in flight. They allow the shoulder straps of the restraint system to pay in and out during normal operations. For safety reasons, they are designed to lock upon impact to prevent the occupant's torso from flailing around the aircraft. The mock inertia reel 120, as shown in FIGS. 3, 6, and 7, simulates the inertia reel when locked, thereby, simulating a crashworthy seating system experiencing a crash. As shown in FIG. 6, the mock inertia reel 120 may include a mock inertia reel shaft 121 with mock inertia blocks 122 disposed on opposite ends of the mock inertia reel shaft 121. The mock inertia reel shaft 121 may be cut in half at its centerline to make two halves (121A and 121B) which lock the shoulder straps 116 and lap strap 117 such that it simulates a restraint system in its locked configuration. In one of the embodiments of the invention, the mock inertia reel 120, specifically the mock inertia reel blocks 122, are mounted to the seat bucket 110 via fasteners and are attached to the restraint system 115 with the shoulder straps 116 juxtapositioned between the two halves of the mock inertia reel shaft 121.

Figure 4:
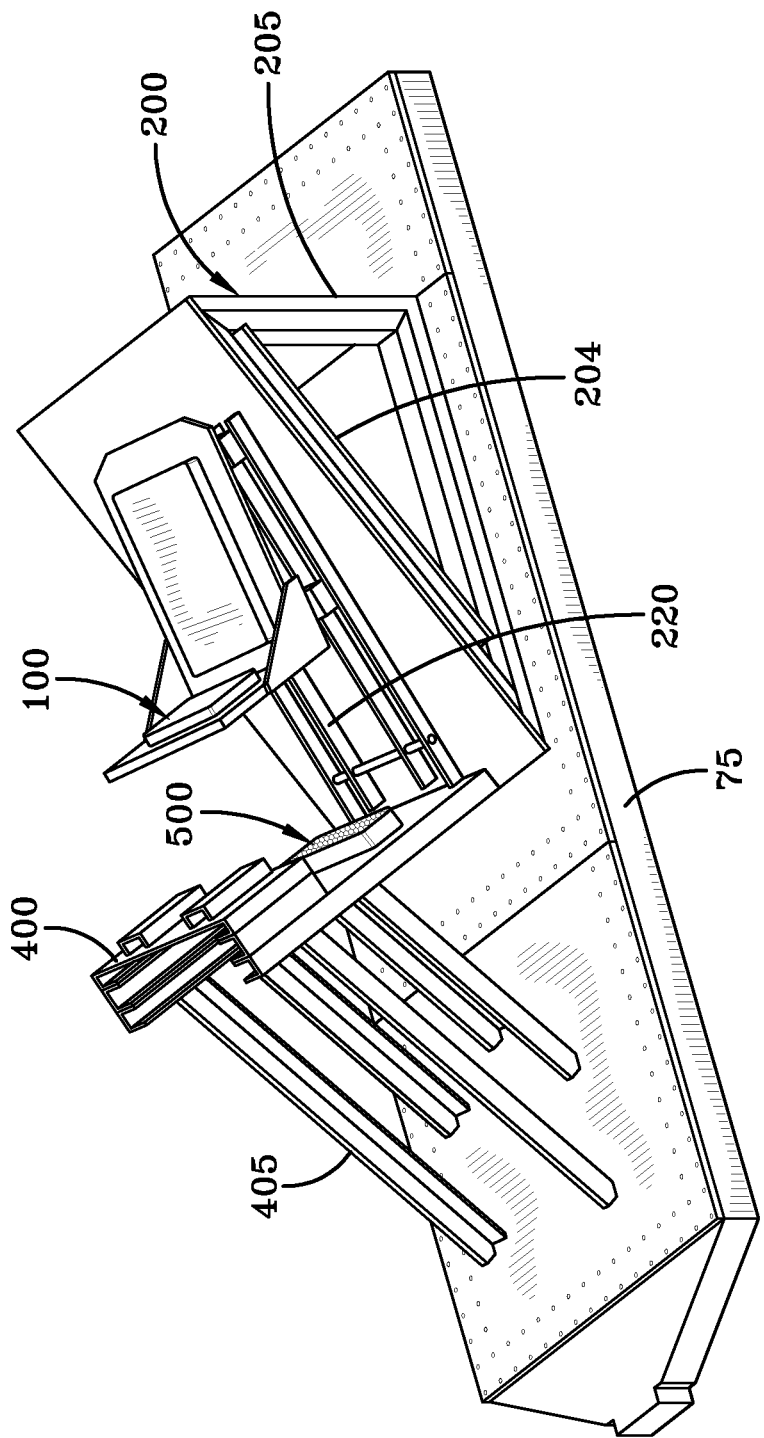
FIG. 4 is a perspective view of an embodiment of the reusable energy absorbing lab seat on a sled.

The seat support structure 200 secures the seat bucket 100 to the sled 75. There may be several configurations of the seat structure 200. The seat bucket 100 may be disposed in a vertical orientation as shown in FIG. 1, such that the anthropomorphic test device 50 is on its back, whereby the seat support structure 200 is only a flat support structure. As shown in FIG. 4, the seat support structure 200 may be a support structure whereby the seat pan 105 is positioned at angle (at a non-vertical and non-horizontal orientation) to the horizontal plane. Adjusting the angle allows crash simulations with different attitudes, such that various different real world scenarios may be simulated. The seat support structure 200 may include a seat interface plate 204 for resting the seat bucket 100 and the energy absorbing system 300. The seat support structure 200 may also include seat support structure beams 205 to angle and support the seat support structure 200. The seat support structure beams 205 may be disposed at one end of the seat interface plate 204 such that the seat support structure beams 205 angle the seat interface plate 204. As further shown in FIGS. 1 and 4, there also may be false floor beams 405 in order to support the false floor structure 400 and to have the false floor structure 400 angled to the vertical plane (not parallel or perpendicular as shown in FIG. 1) and appropriately correspond to the seat bucket 100.

The seat support structure 200 secures the seat bucket 100 and energy absorbing system 300 to the sled 75 that corresponds to a horizontal accelerator 80. The horizontal accelerator 80 may include a sled track 81 (which includes two substantially parallel rails) and a hydraulically controlled linear actuator 82 to move and/or accelerate the objects, particularly the sled, along the track. The preferred horizontal accelerator 80 operates at a 50 G maximum acceleration, with a 5,000 pound maximum payload at 20 G's.

As seen in FIG. 1, the seat bucket 100 translates on two guide rails 220 and four linear bearings 210. The guide rails 220 are attached to the support structure 200 particularly to the seat interface plate 204. The linear bearings 210 are used to secure the seat bucket 100 to the guide rails 220 and the support structure 200 and allow the seat bucket 100 to translate during the energy absorption process.

Figure 5:
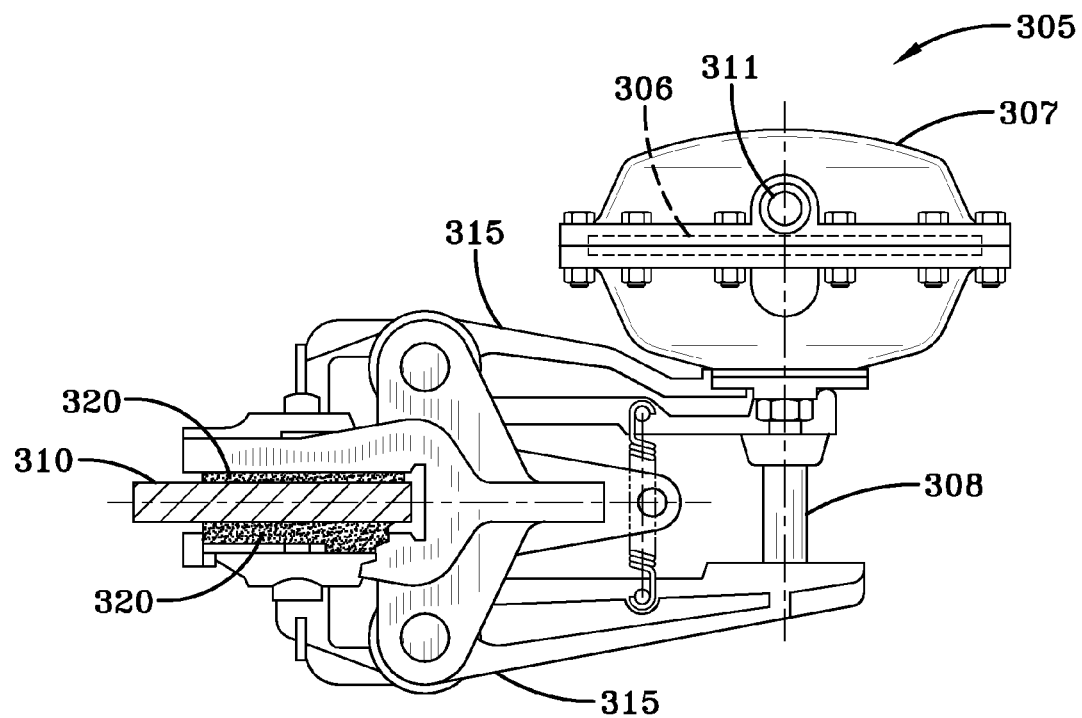
FIG. 5 is a side view of an embodiment of the energy absorbing system.

The energy absorbing system 300 utilizes a pneumatic brake system. As shown in FIG. 3, the energy absorbing system 300 includes a brake caliper 305 and a corresponding brake rail 310. As shown in FIG. 5, the brake caliper 305 may include a diaphragm 306, a diaphragm housing 307, a piston system 308, two levers 315, and two brake pads 320. The diaphragm housing 307 includes an air tank inlet 311 that allows fluid communication with an air tank (not shown) and the diaphragm 306. The diaphragm 306 is disposed within the diaphragm housing 307, and when the diaphragm 306 becomes pressurized the diaphragm 306 pushes on the piston system 308, which extends out of the diaphragm housing 307, such that the levers 315 are pushed outward. Each lever 315 communicates with a corresponding brake pad 320 such that when the levers are pushed outward or actuated, the brake pads 320 are pushed inward and press on the brake rail 310. When air pressure is applied to the diaphragm 306, the brake pads 320 press on the brake rail 310 creating friction when moved through the brake pads 320. This friction causes energy to be converted in the form of heat. If enough pressure is applied, the real energy absorbing lab seat 10 may be stopped reducing the injury potential of the simulated crash.

The false floor structure 400 may be a metal platform or any type of structure or material that simulates the floor of a vehicle or aircraft. The false floor structure is supported by diagonal supports 405.

In one of the preferred embodiments of the invention, the fail-safe system 500 is used to absorb the energy of a runaway seat. In the event that the energy absorbing system 300 fails, the fail-safe system 500 absorbs the energy of the seat reducing the risk of failure and damage to the seat bucket 100, the anthropomorphic test device 50, and the horizontal accelerator 75. The fail-safe system 500 is composed of an aluminum honey comb structure that crushes when the seat pan 105 strokes past a predetermined distance on the seating system.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A reusable energy absorbing lab seat, comprising of:
   a seat bucket for holding an anthropomorphic test device;
   a seat support structure for securing the seat bucket to a sled, the sled corresponding to a horizontal accelerator such that energy may be imposed by the horizontal accelerator on the seat bucket and the anthropomorphic test device;
   an energy absorbing system for absorbing energy imposed by the horizontal accelerator on the seat bucket and the anthropomorphic test device;
   a false floor structure for simulating a real floor of a vehicle, the false floor structure being able to be adjusted based on the size of the anthropomorphic test device; and,
   a fail-safe system for reducing damage to the reusable energy absorbing lab seat, the anthropomorphic test device, and lab facilities in case the energy absorbing system fails.

2. The reusable energy absorbing lab seat of claim 1, wherein the energy absorbing system is a pneumatic brake system.

3. The reusable energy absorbing lab seat of claim 2, wherein the seat bucket is disposed in a vertical orientation, such that the anthropomorphic test device is on its back.

4. The reusable energy absorbing lab seat of claim 2, wherein the seat bucket is disposed in a non-vertical and non-horizontal orientation, such the anthropomorphic device is neither on its back or sitting straight up.

5. The reusable energy absorbing lab seat of claim 2, wherein the seat bucket includes a seat pan, a seat back, a restraint system, and a mock inertia reel.

6. The reusable energy absorbing lab seat of claim 5, wherein the seat bucket further includes seat cushions.

7. The reusable energy absorbing lab seat of claim 1, wherein the fail safe system is a metallic honeycomb structure.

* * * * *